(12) United States Patent
Wojtyla (10) Patent No.: US 12,054,340 B2
(45) Date of Patent: Aug. 6, 2024

(54) FLEXIBLE TRACK-SHELVING SYSTEM AND A KIT FOR CONVERTING A FRAME INTO A FLEXIBLE TRACK-SHELVING SYSTEM

(71) Applicant: conTeyor International nv, Merelbeke (BE)

(72) Inventor: Henryk Wojtyla, Merelbeke (BE)

(73) Assignee: conTeyor International nv, Merelbeke (BE)

( * ) Notice: Subject to any disclaimer, the term of this patent is extended or adjusted under 35 U.S.C. 154(b) by 2 days.

(21) Appl. No.: 18/048,231

(22) Filed: Oct. 20, 2022

(65) Prior Publication Data

US 2023/0121394 A1   Apr. 20, 2023

(30) Foreign Application Priority Data

Oct. 20, 2021   (BE) .................................. 2021/5821

(51) Int. Cl.
| | | |
|---|---|---|
| A47B 47/00 | (2006.01) | |
| A47B 47/02 | (2006.01) | |
| B65G 1/04 | (2006.01) | |
| B65G 1/10 | (2006.01) | |

(52) U.S. Cl.
CPC ........ B65G 1/0457 (2013.01); A47B 47/0083 (2013.01); A47B 47/028 (2013.01); B65G 1/10 (2013.01)

(58) Field of Classification Search
CPC .......... B65G 1/10; B65G 1/06; B65G 1/0457; B65G 2207/30; A47B 47/0083; A47B 47/028; A47B 47/02; A47B 45/00; A47B 47/021; A47B 47/027

USPC ......................................... 211/113, 191, 186
See application file for complete search history.

(56) References Cited

U.S. PATENT DOCUMENTS

| | | | | |
|---|---|---|---|---|
| 2,966,991 | A * | 1/1961 | Duffner ................... | B65G 1/02 211/60.1 |
| 3,056,507 | A * | 10/1962 | Squires, Jr. ............ | A47B 57/18 108/106 |
| 3,519,140 | A * | 7/1970 | Wellman, Jr. .......... | A47B 55/02 211/186 |
| 3,695,456 | A * | 10/1972 | Lewis ....................... | A47F 5/14 211/191 |
| 3,726,413 | A * | 4/1973 | Squires ................ | A47B 57/402 108/107 |
| 4,261,470 | A * | 4/1981 | Dolan ...................... | F16B 7/22 403/237 |

(Continued)

FOREIGN PATENT DOCUMENTS

| | | | | |
|---|---|---|---|---|
| EP | 4169853 A1 * | 4/2023 | .......... | B65G 1/0457 |
| WO | 2018046554 A1 | 3/2018 | | |

*Primary Examiner* — Jennifer E. Novosad
(74) *Attorney, Agent, or Firm* — Vorys, Sater, Seymour and Pease LLP (57) ABSTRACT

A tracked shelving system comprises a frame having a plurality of vertical posts and horizontal beams, and further comprises a track and shelving module connected to said frame, said modules comprising a plurality of beam hooks, a plurality of cross-beams, a plurality of track hooks, a plurality of track beams and a shelving assembly, wherein a beam hook comprises at least two telescopic U-shaped profiles, wherein an outer profile comprises a lip for hooking onto said horizontal beams, and an inner profile comprises a horizontal support surface for supporting a cross-beam.

15 Claims, 10 Drawing Sheets

(56) References Cited

U.S. PATENT DOCUMENTS

| | | | | |
|---|---|---|---|---|
| 4,351,244 A * | 9/1982 | Suttles | A47B 47/024 | 108/193 |
| 4,717,305 A * | 1/1988 | Edwards | B65G 1/0457 | 414/349 |
| 5,481,988 A * | 1/1996 | Dess | B66B 9/16 | 108/106 |
| 5,718,341 A * | 2/1998 | Robertson | A47F 7/285 | 211/74 |
| 6,739,463 B2 * | 5/2004 | Wishart | A47B 96/1441 | 211/175 |
| 7,475,955 B2 * | 1/2009 | Dressendorfer | A47B 88/42 | 312/334.26 |
| 7,950,533 B2 * | 5/2011 | Adams | A47F 5/01 | 211/113 |
| 8,459,475 B2 * | 6/2013 | Higueroa | A47B 96/00 | 211/162 |
| 8,714,864 B2 * | 5/2014 | Wojtowicz | A47F 5/14 | 403/109.8 |
| 8,827,090 B2 * | 9/2014 | Kropveld | B65G 1/0457 | 211/195 |
| 8,827,232 B2 * | 9/2014 | Crowley | A47B 43/003 | 248/676 |
| 8,967,401 B2 * | 3/2015 | Wu | A47B 47/0083 | 403/217 |
| 9,161,638 B2 * | 10/2015 | Ehmke | A47F 5/0087 | |
| 9,290,322 B2 * | 3/2016 | Heijmink | A47B 47/0058 | |
| 9,999,301 B2 * | 6/2018 | Stauffer | B65D 19/385 | |
| 11,046,512 B2 * | 6/2021 | Vermeulen | B65G 1/026 | |
| 2002/0112937 A1 * | 8/2002 | Lutz | B65G 41/005 | 193/37 |
| 2004/0007550 A1 * | 1/2004 | Leeman | A47F 5/101 | 211/187 |
| 2007/0246434 A1 | 10/2007 | Adams et al. | | |
| 2012/0187065 A1 * | 7/2012 | Song | A47B 55/00 | 211/191 |
| 2018/0346242 A1 * | 12/2018 | Grosse | B65G 1/0414 | |
| 2023/0121394 A1 * | 4/2023 | Wojtyla | B65G 1/0457 | 211/113 |

* cited by examiner

FLEXIBLE TRACK-SHELVING SYSTEM AND A KIT FOR CONVERTING A FRAME INTO A FLEXIBLE TRACK-SHELVING SYSTEM

TECHNICAL FIELD

The invention relates to the technical field of storage in storage spaces and/or warehouses.

PRIOR ART

In times where globalization and time are essential and crucial aspects for commercial institutions, all kind of different products and materials have to be available in quantities to guarantee a swift and reliable service. In order to quickly provide customers and/or employees with the desired product, it is necessary to organize said products in a structural and easy way without taking up too much space in order to save costs. An important part of the storage and handling of goods is the retrieval of products for sale from a warehouse, which is usually done manually. This results in a time-consuming and labor-intensive process of retrieving goods from a warehouse when processing an order, which represents up to 55% of warehouse operating costs. It is therefore very important to store and organize products effectively in a user-friendly, easily accessible and clear storage system.

Such a storage system is known, inter alia, from BE 1 024 185 (BE '185). BE '185 describes a tracked shelving system comprising a frame with vertical posts connected by horizontal beams and supporting the horizontal beams, a plurality of beam hooks coupled to the horizontal beams, a plurality of cross-beams coupled to at least two beam hooks via an opening in the beam hooks, a plurality of track hooks coupled to the cross-beams and a plurality of track beams supported by the track hooks. Between the coupled series of track beams is a horizontally displaceable shelving assembly.

This known device has the following drawback. The beam hooks coupled to the horizontal beams extend below the horizontal beams. In the part extending below the horizontal beams is the opening for coupling a cross-beam. As a result, the cross-beams and automatically the track beams are located below the horizontal beams, so that useful storage space in the storage system is occupied by the cross-beams and track beams. Another drawback of the known storage system is that beam hooks hook over the horizontal beams. As a result, when loading goods at a level above the storage system, a forklift truck may hit the beam hooks, causing damage to the beam hooks.

The present invention aims to solve at least some of the above problems or drawbacks.

SUMMARY OF THE INVENTION

In a first aspect, the present invention relates to a tracked shelving system according to claim 1.

The great advantage of this tracked shelving system is that a beam hook comprises at least two telescopic U-shaped profiles. An outer profile comprises a lip for hooking onto the horizontal beams. An inner profile comprises a horizontal support surface for supporting a cross-beam. Because the beam hook is telescopic, the cross-beams can be positioned between or at a desired height below the horizontal beams with the aid of these beam hooks. As a result, a flexible layout of the tracked shelving system is possible with one type of beam hook, for instance a tracked shelving system in which the shelving assembly is positioned at a desired height above a floor surface or, for example, a shelving assembly in which storage space in the tracked shelving system is maximized within the frame. The beam hooks do not hook over, but on the horizontal beams, so that there is a minimum risk of damage by a forklift when loading goods at a level above the storage system.

Preferred embodiments of the tracked shelving system are set forth in claims 2-14.

A specific preferred embodiment relates to a tracked shelving system according to claim 5.

In this preferred embodiment, the beam hook comprises a J-shaped bracket, wherein the J-shaped bracket is slidably attached to the underside of the horizontal support surface with a long leg of the J-shaped bracket. A short leg of the J-shaped bracket serves to support a track beam. As a result, a track beam can not only be placed inside the frame, but it is also possible to position the track beam outside the frame by sliding the J-shaped bracket, whereby storage space in the tracked shelving system can be expanded outside the frame.

In a second aspect, the present invention relates to a kit according to claim 15. This kit is advantageous for converting a frame into a tracked shelving system by allowing flexible arrangement of the tracked shelving system using telescopic beam hooks. For example, a shelving module can be positioned at a desired height above a floor surface or storage space in the tracked shelving system can be maximized within the frame by positioning the cross-beams between horizontal beams of the frame. No specific beam hooks for a frame are required, which makes the kit suitable for multiple frames, with different dimensions.

DETAILED DESCRIPTION

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, "a" and "the" refer to both the singular and the plural, unless the context presupposes otherwise. For example, "a segment" means one or more segments.

The terms "comprise," "comprising," "consist of," "consisting of," "provided with," "include," "including," "contain," "containing," are synonyms and are inclusive or open terms that indicate the presence of what follows, and which do not exclude or prevent the presence of other components, characteristics, elements, members, steps, as known from or disclosed in the prior art.

Quoting numerical ranges by endpoints includes all integers, fractions and/or real numbers between the endpoints, these endpoints included.

In a first aspect, the invention relates to a tracked shelving system that allows the use of an existing frame in a warehouse as a storage system.

According to a preferred embodiment, the tracked shelving system comprises a frame having a plurality of vertical posts and a plurality of horizontal beams supported by the vertical posts, and further comprising a track and shelving module connected to said frame, wherein said modules comprise:
- a plurality of beam hooks coupled to said horizontal beams;
- a plurality of cross-beams coupled to at least two beam hooks;
- a plurality of track hooks coupled to said cross-beams, the cross-beams having a plurality of notches positioned regularly along the length of said cross-beam to clamp track hooks to the cross-beams;
- a plurality of track beams supported by said track hooks; and
- a shelving assembly that is displaceable between a coupled series of track beams;

A beam hook comprises at least two telescopic U-shaped profiles. The telescopic profiles are preferably made of folded steel plate. The U-shaped profiles have a cross-section in the shape of a letter U. The U-shaped profiles comprise a base and a side wall at each end of the base. The side walls have a height, measured perpendicularly from the base, of at least 5 cm, preferably at least 6 cm, more preferably at least 7 cm. The telescopic U-shaped profiles are slidably placed in each other, wherein each subsequent U-shaped profile is located within a previous U-shaped profile, wherein the base of a subsequent U-shaped profile rests against the base of a previous U-shaped profile, and wherein the side walls of a subsequent U-shaped profile rest against the side walls of a previous U-shaped profile.

An outer U-shaped profile is one of the telescopic U-shaped profiles and comprises a lip for hooking onto said horizontal beams. The lip is preferably a folded-over edge of the base. The edge preferably extends beyond the side walls before folding. The lip preferably extends at least 1 cm beyond the side walls, more preferably at least 2 cm and even more preferably at least 3 cm. The lip is preferably folded over 90°±3° with respect to the base, preferably 90°±2°, more preferably 90°±1° and even more preferably 90°±0.5°. The lip is folded in a direction away from free ends of the side walls.

An inner profile is one of the telescopic U-shaped profiles and comprises a horizontal support surface for supporting a cross-beam. The support surface is preferably a folded-over edge of the base. The support surface preferably extends beyond the side walls before folding. The support surface preferably extends at least 5 cm beyond the side walls, more preferably at least 6 cm and even more preferably at least 7 cm. The support surface is preferably folded over 90°±3° with respect to the base, preferably 90°±2°, more preferably 90°±1° and even more preferably 90°±0.5°. The support surface is folded towards free ends of the side walls.

The inner profile is positioned within the outer profile such that the lip and support surface are located at opposite ends of the bases of the inner and outer profile. The base of the outer profile is placed against a standing wall of a horizontal beam of the frame. The lip is located on top of said horizontal bar. A cross-beam is coupled to a beam hook by placing the cross-beam between the side walls of the inner profile and lying on the support surface. The cross-beam is immobilized by the side walls in a direction transverse to the side walls. The cross-beam is immobilized by the support surface in a direction directed toward the support surface. The coupling between beam hook and cross-beam is removable. Beam hooks at opposite ends of a cross-beam are coupled to horizontal beams of the frame because the bases of the beam hooks lie against the opposite ends of the cross-beam and are immobilized in that direction. The coupling between a beam hook and a horizontal beam is removable.

An intermediate profile is one of the telescopic U-shaped profiles. Intermediate profiles are located between the outer profile and the inner profile. Intermediate profiles do not comprise a lip or horizontal support surface, as a result of which they are freely slidable in a groove bounded by the base and the side walls of a previous U-shaped profile.

The tracked shelving system has the advantage that it can be easily changed according to the needs of a customer as the notches present on the cross-beam allow track hooks to be fixed at desired distances from each other over the length of the cross-beam, while providing a sturdy, safe and efficient storage system.

This embodiment is advantageous because the beam hook is telescopic, so that the cross-beams can be positioned between or at a desired height below the horizontal beams with the aid of these beam hooks. As a result, a flexible layout of the tracked shelving system is possible with one type of beam hook, for instance a tracked shelving system in which the shelving assembly is positioned at a desired height above a floor surface or, for example, a shelving assembly in which storage space in the tracked shelving system is maximized within the frame. The beam hooks do not hook over, but on the horizontal beams, so that there is a minimum risk of damage by a forklift when loading goods at a level above the storage system. Removable couplings between beam hook and horizontal beam and between beam hook and cross-beam is advantageous as it allows manual adjustments without requiring a specific set of tools and/or skills.

In a preferred embodiment, a beam hook comprises an outer profile, an intermediate profile and an inner profile. This is advantageous for sufficient flexibility in positioning a support beam between or at a desired height below the horizontal beams, while the beam hook has a limited thickness, so that a support beam can have a maximum length between the horizontal beams.

In a preferred embodiment, the telescopic U-shaped profiles comprise locking holes. The locking holes are aligned. The locking holes are arranged in a longitudinal direction in the side walls of the telescopic U-shaped profiles. Preferably, the locking holes are arranged in a folded-over edge of the side walls, the folded over edge being substantially parallel to the base of the telescopic U-shaped profiles. The locking holes are preferably arranged symmetrically with respect to a longitudinal axis of a U-shaped profile. There is always an equal first intermediate distance between adjacent holes of the outer profile and optional intermediate profiles. There is always an equal second intermediate distance between adjacent locking holes of the inner profile. The first intermediate distance and the second intermediate distance are different.

The locking holes are advantageous for fixing mutual positions between the telescopic U-shaped profiles after they have been retracted or extended to a desired length. The telescopic U-shaped profiles are attached to each other using pins, using bolts and nuts, using a click system or using another suitable locking means. A different first intermediate distance and second intermediate distance are advantageous in order to obtain a smaller adjustment step, without having to provide locking holes with a small intermediate distance in all telescopic U-shaped profiles. An equal first intermediate distance between locking holes of the outer profile and intermediate profiles is advantageous to ensure that when an outer profile and an intermediate profile are displaced with respect to each other, their locking holes are aligned such that it is guaranteed that a locking means can be placed through a locking hole of the inner profile and the aligned locking holes of optional intermediate profiles and/or the outer profile.

According to a preferred embodiment, the beam hook, in a retracted position, has a height which is at most equal to a height of said horizontal beams of the frame, increased by a thickness of the lip for hooking onto said horizontal beams. This embodiment is advantageous because it allows the beam hook, with the exception of the lip, to be located completely between the horizontal beams, so that storage space in the tracked shelving system within the frame is maximized.

According to a preferred embodiment, the beam hook comprises a U-shaped bracket for clamping a cross-beam between the U-shaped bracket and the horizontal supporting surface. The U-shaped bracket is detachably fastened to the horizontal support surface with a bracket of an attachment means, such as for instance bolts and nuts or clamps or another suitable means. The U-shaped bracket is advantageous for additional immobilization of a support beam on the horizontal support surface. Because the U-shaped bracket is detachable, a coupling of a beam hook on a support beam is removable.

According to a further embodiment, the U-shaped bracket comprises teeth. The teeth are positioned on an edge of legs of the U-shaped bracket. The teeth can be clicked into notches on the cross-beam. This embodiment is advantageous in order to prevent a cross-beam from sliding out of a beam hook in a longitudinal direction of the cross-beam when assembling or modifying the tracked shelving system.

In a preferred embodiment, the beam hook comprises a J-shaped bracket for supporting a cross-beam. The J-shaped bracket is slidably attached to the underside of the horizontal support surface with a long leg of the J-shaped bracket. A free end of the long leg is directed in the same direction as the free ends of the side walls of the telescopic U-shaped profiles. Short legs of the J-shaped bracket form a hook, suitable for receiving and supporting a track beam. The hook is located under the horizontal support surface. The hook preferably comprises an attachment means for securing a track beam to the J-shaped bracket. Non-limiting examples of an attachment means are a bolt and nut, a rivet, a clamp or other suitable means. The J-shaped bracket preferably comprises a slot in the long leg for slidably securing the J-shaped bracket to the horizontal support surface. The J-shaped bracket is preferably slidable over a distance of at least 10 cm, preferably at least 15 cm, more preferably at least 20 cm, even more preferably at least 25 cm and even more preferably at least 30 cm.

This embodiment is advantageous because as a result a track beam can not only be positioned within the frame, but because it is also possible to position a track beam outside the frame by sliding the J-shaped bracket outside the frame, whereby storage space in the tracked shelving system can be expanded outside the frame.

According to a preferred embodiment, the coupling of track hooks to a cross-beam is removable. In a more preferred embodiment, the coupling of the track hooks to a cross-beam comprises a removable click-and-clamp mechanism. These features allow for manual adjustments as the track hooks can be easily disconnected and replaced without requiring a specific set of tools and/or skills.

Preferably, the track hooks comprise an opening through which a cross-beam can extend. More preferably, the track hooks comprise an edge that surrounds the opening of the track hooks, and which allows removably clamping the track hooks into the notches of a cross-beam. The edge is snapped into the notches of the cross-beam.

According to a further embodiment, the edge surrounding the opening of a track hook defines one or more teeth through which the track hooks are removably clickable into notches provided on the cross-beam. The one or more teeth are clicked into the notches of the cross-beam. These means allow for easy uncoupling and/or replacement of the tracked shelving system without tools, thus allowing for easy and uncomplicated adjustment.

According to a further embodiment, the opening of one or more track hooks is incompletely surrounded by an edge. The latter allows the said one or more track hooks to be uncoupled and/or replaced without having to uncouple other beam hooks and/or track hooks from a cross-beam.

According to a preferred embodiment, the cross-beams comprise notches every 5 to 100 mm, more preferably every 5 to 50 mm, and even more preferably every 5 to 20 mm. This allows for adjusting placement of the track hooks at small intervals across the length of a cross-beam, and thus, enables a high degree of adjustment.

According to a preferred embodiment, the track hooks are provided with a securing clip. Rail beams are attached to a track hook by means of one or more securing clips. The latter makes it possible to guarantee the fixing clamping of the track hooks and prevents undesired loosening or uncoupling of the track hooks from the cross-beam.

According to an embodiment, the cross-beams, track beams and track hooks preferably have a profile thickness of 1.5 to 2.5 mm, such as, for example, 2 mm, which allows a lightweight, easy to transport and easy handling of said components.

According to a preferred embodiment, the telescopic U-shaped profiles of the beam hooks have a profile thickness between 2 mm and 6 mm. As a result, the U-shaped profiles are sufficiently strong to prevent tearing out of, for instance, locking holes, as in a previously described embodiment, under heavy load.

According to a further embodiment, the telescopic U-shaped profiles of the beam hooks have a different profile thickness, wherein the outer profile has the greatest profile thickness. The outer profile is subjected to the greatest load per surface unit of the telescopic U-shaped profiles on the lip. By using a smaller profile thickness for other of the telescopic U-shaped profiles, a weight saving is obtained without weakening the telescopic U-shaped profiles as a whole.

According to a preferred embodiment, the cross-beams comprise two track beams placed back to back. This ensures an almost uniform production process of both track beams and cross-beams, which reduces production costs, production time and the like.

According to a preferred embodiment, the track hooks preferably comprise one or more at least partially folded edges. Said one or more partially folded edges provide firmness to said hooks and allow for a relatively thin profile thickness without sacrificing safety, strength and stiffness.

According to a preferred embodiment, the track hooks comprise at least one small surface perpendicular to the main surface of track hooks. Said small surface perpendicular to the main surface of the track hooks supports at least part of a track beam. These means prevent bending and/or sagging of track beams. More preferably, said small surface, comprises one or more at least partially upright surfaces, preferably parallel to the main surface of the track hook. Said one or more at least partially upright surfaces prevent slipping and/or falling of the track from said small surface. Even more preferably, one or more mounting holes present on a track beam are aligned with one or more mounting holes present on a track hook, and which are secured by means of one or more rivets, screws or the like. Most preferably, a track securing clip is secured to a track hook through a track securing hole provided on the main surface of a track hook. These means allow the removable clamping of track beams between the track securing clip and the one or more at least partially upright surfaces of the small surface perpendicular to the main surface of the track hook. The latter ensures the fixation of the track beams, and consequently the safety, to the tracked shelving system according to the present invention.

According to a preferred embodiment, track beams are coupled two by two. Coupled track beams are oriented in reverse directions with respect to each other. The latter ensures that coupled track beams can be connected by one or more common roller-bars.

According to a preferred embodiment, the track beams comprise a portion for receiving mobility components. More preferably, said mobility components are attached to said roller-bars. The latter ensures synchronous movement of said mobility components in coupled track beams.

In a second aspect, the invention relates to a kit for converting a frame into a tracked shelving system. The tracked shelving system is according to the first aspect.

According to a preferred embodiment, the kit comprises:
a plurality of beam hooks (3);
a plurality of cross-beams (2);
a plurality of track hooks (5,6);
a plurality of track beams (4); and
components of a shelving module (14);

A beam hook comprises at least two telescopic U-shaped profiles, wherein an outer profile comprises a lip for hooking onto the frame, and wherein an inner profile comprises a horizontal support surface for supporting a cross-beam. The lip is suitable for hooking onto horizontal beams of the frame.

This kit is advantageous for converting a frame into a tracked shelving system by allowing flexible arrangement of the tracked shelving system using telescopic beam hooks. For example, a shelving module can be positioned at a desired height above a floor surface or storage space in the tracked shelving system can be maximized within the frame by positioning the cross-beams between horizontal beams of the frame. No specific beam hooks for a frame are required, which makes the kit suitable for multiple frames, with different dimensions.

According to a preferred embodiment, the components of the shelving module comprise at least a plurality of roller-bars, a plurality of mobility components, a pair of side walls, an upper wall, one or more floors, one or more backstops, and one or more upper connecting elements.

Preferably, at least a portion of the upper connecting elements, upper wall, side wall, floor and/or backstop are flexible. This ensures that the whole weighs less and is easy to transport and easy to handle. Said at least partially flexible components are more preferably folded into the kit to reduce proportions of the kit.

One skilled in the art will appreciate that a tracked shelving system according to the first aspect is preferably obtained using a kit according to the second aspect and that a kit according to the second aspect is configured to convert a frame into a tracked shelving system according to the first aspect. Each feature described in this document, both above and below, can therefore relate to any of the two aspects of the present invention.

In what follows, the invention is described by way of non-limiting figures illustrating the invention, and which are not intended to and should not be interpreted as limiting the scope of the invention.

DESCRIPTION OF THE FIGURES

Figure 1:
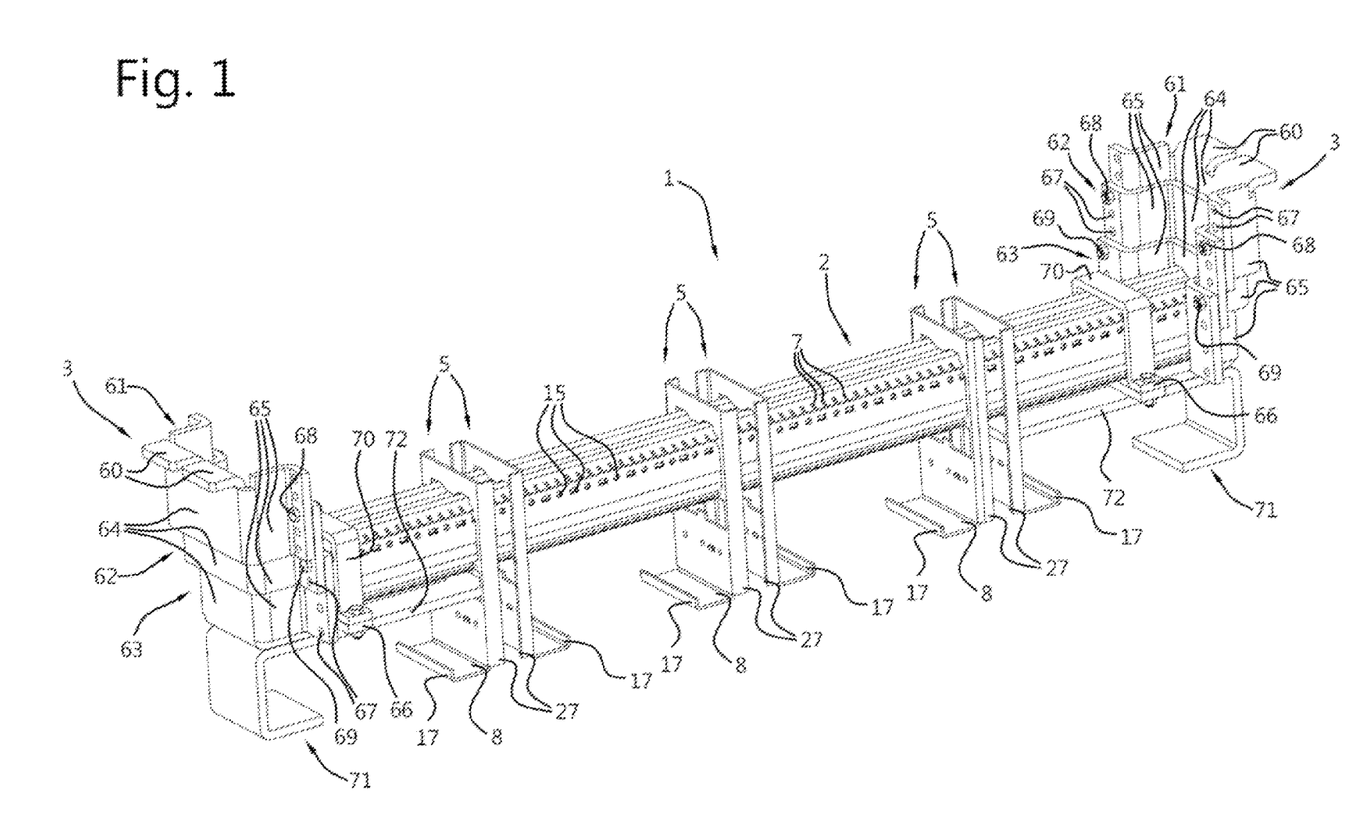
FIG. 1 shows a cross-beam (2) coupled to two beam hooks (3) and six track hooks (5), illustrating a preferred embodiment of an assembled cross-beam set (1), according to the present invention.

FIG. 1 shows a cross-beam (2) coupled to two beam hooks (3) and six track hooks (5), illustrating a preferred embodiment of an assembled cross-beam set (1).

The assembled cross-beam set (1) comprises a cross-beam (2), two beam hooks (3) and six closed type track hooks (5). The track hooks (5) are removable but clamped firmly to the cross-beam (2) by mating teeth (26) of the track hooks (5) in notches (7) provided on the cross-beam (2).

The beam hooks (3) comprise three telescopic U-shaped profiles, an outer profile (61), an intermediate profile (62) and an inner profile (63). The beam hooks (3) are shown in an extended position. The telescopic U-shaped profiles comprise a base (64) and a side wall (65) at each end of the base (64). The telescopic U-shaped profiles are slidably placed in each other, wherein the bases (64) and the side walls (65) abut each other. The outer profile (61) comprises a lip (60)

for hooking a beam hook (3) onto a horizontal beam (21) of a frame (13). The lip (60) is a folded-over edge of the base (64) of the outer profile (61). The inner profile (63) comprises a horizontal support surface (66) for supporting the cross-beam (2). The horizontal support surface (66) is a folded-over edge of the base (64) of the inner profile (63). The horizontal support surface (66) extends beyond the side walls (65). The inner profile (63) is positioned within the outer profile (61) such that the lip (60) and the horizontal support surface (66) are located at opposite ends of the bases (64) of the inner profile (63) and the outer profile (61). The side walls (65) of the telescopic U-shaped profiles comprise locking holes (67). The intermediate profile (62) is attached to the outer profile (61) by means of bolts and nuts (68). The inner profile (63) is attached to the intermediate profile (62) by means of bolts and nuts (69). It will be apparent to a person skilled in the art that in a retracted position the three telescopic U-shaped profiles can be fastened jointly together with bolts and nuts (69). The beam hooks (3) comprise a U-shaped bracket (70). The cross-beam (2) is clamped between the U-shaped bracket (70) and the horizontal support surface (66). The beam hooks (3) comprise a J-shaped bracket (71), for supporting a track beam (4) on a short leg of the J-shaped bracket (71). No track beams (4) are shown in FIG. 1. The J-shaped bracket is slidably attached to the underside of the horizontal support surface (66) with a long leg (72). By using the J-shaped brackets (71) it is possible to position track beams (4) under the telescopic U-shaped profiles (61, 62, 63) of beam hooks (3), extending available storage space in the tracked shelving system within a frame (13). The frame (13) is not shown in FIG. 1. It will be apparent to one skilled in the art that if the beam hooks (3) do not comprise J-shaped brackets (71), two additional track hooks (5) are required to support an equal number of track beams (4).

Figure 2:
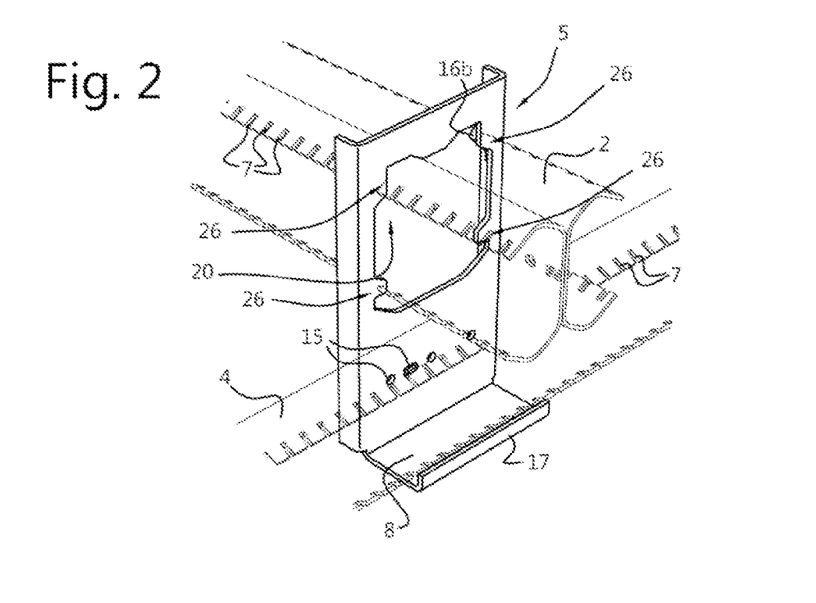
FIG. 2 shows a preferred embodiment of a closed type track hook, the coupling of said track hook (5) by means of teeth (26) on a cross-beam (2) and the support of a track beam (4) by a closed type track hook (5), according to the present invention.

FIG. 2 shows a preferred embodiment of a closed type track hook, the coupling of said track hook (5) by means of teeth (26) on a cross-beam (2) and the support of a track beam (4) by a closed type track hook (5).

The track hook (5) from FIG. 2 corresponds to the track hooks (5) from FIG. 1. The opening (20) for receiving at least part of a cross-beam (2) is completely surrounded by an edge. The closed type track hook completely surrounds the cross-beam (2) while clamped to a cross-beam (2) by the exact fitting of teeth (26) in notches (7) present on the cross-beam (2). A part of a track beam (4) is supported by a small surface (8) of the track hook (5). By providing an upright surface (17) at said small surfaces (8), the track beam (4) is prevented from sliding or falling. The track beams (4) can optionally be secured, by fixing (not shown) the track beam (4) to the track hook (5) by means of applying and fixing one or more rivets, one or more screws or the like through the mounting holes (15). The track hook (5) further comprises a securing clip (16b) to prevent spontaneous release of the track hook (5) on the cross-beam (2). The securing clip (16b) opens when the track hook (5) is placed on the cross-beam (2) and closes only when the track hook (5) is correctly positioned relative to the notches (7) of the cross-beam (2).

Figure 3:
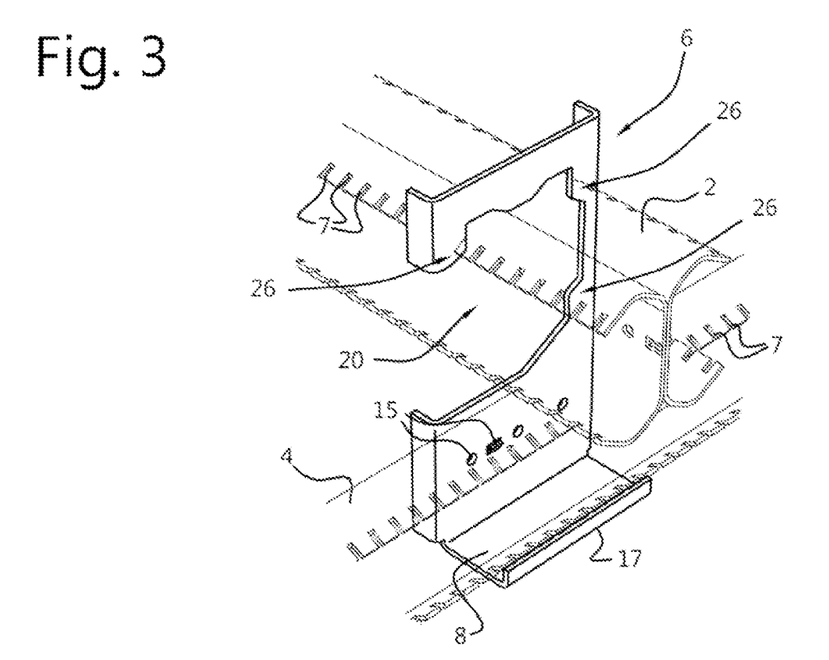
FIG. 3 shows a preferred embodiment of an open type track hook, the coupling of said track hook (6) by means of teeth (26) on a cross-beam (2) and the support of a track beam (4) by an open type track hook (6), according to the present invention.

FIG. 3 shows a preferred embodiment of an open type track hook, the coupling of said track hook (6) by means of teeth (26) on a cross-beam (2) and the support of a track beam (4) by an open type track hook (6).

The open type track hook (6) is an alternative embodiment of the closed type track hook (5) shown in FIG. 2. The track hooks (5) and (6) are very similar. The opening (20) for receiving at least part of a cross-beam (2) is not completely surrounded by an edge. An open type track hook (6) does not completely surround the cross-beam (2) while it is secured to the cross-beam (2) with teeth (26) in notches on the cross-beam (2). The track hook (6) has a similar small surface (8) as the track hook (5).

Figure 4:
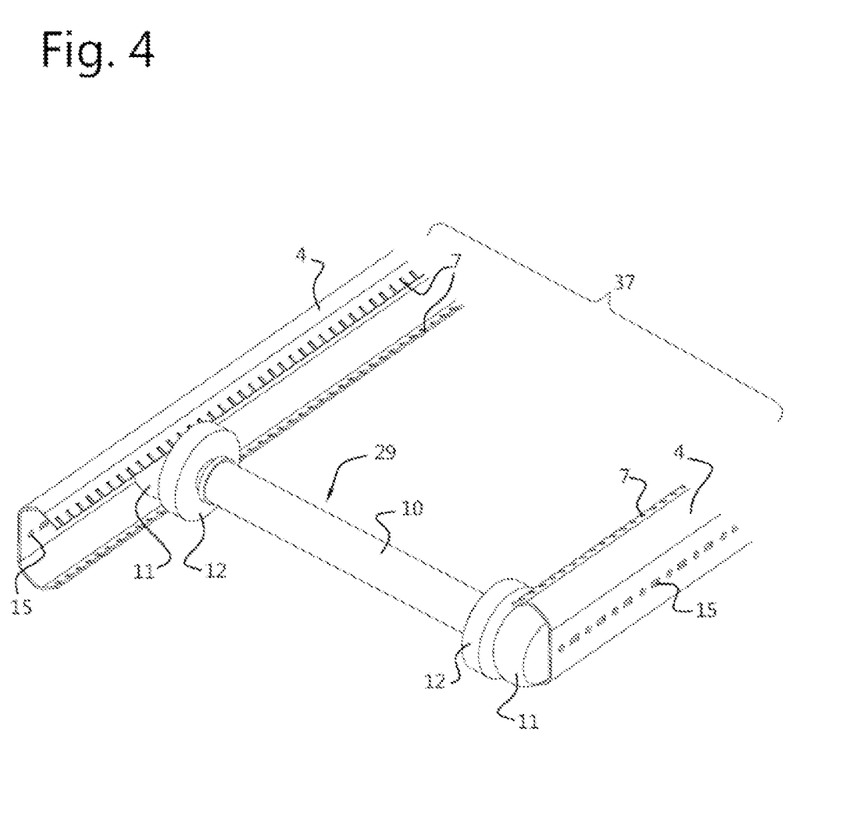
FIG. 4 shows a detailed representation of a preferred embodiment of a roller-bar (29), supported by two oppositely oriented track beams (4) providing a track for rolling or sliding of mobility components (11) connected to the extremities of a roller-bar (29), according to the present invention.

FIG. 4 shows a detailed representation of a preferred embodiment of a roller-bar (29), supported by two oppositely oriented track beams (4) providing a track (37) for rolling or sliding of mobility components (11) connected to the extremities of a roller-bar (29).

The roller-bar (29) is suitable for suspending and moving a shelving assembly (28). Said roller-bar (29) comprises a rod-like structure (10) to which two wheels (11) and two discs (12) are attached. Said wheels are configured in such a way that they can roll in track beams (4) located opposite each other, allowing movement of the roller-bar (29), and therefore, the shelving assembly (28). The discs (12) prevent scratches and accelerated wear of the wheels (11) by preventing movement of the wheels (11) in a direction perpendicular—in a horizontal plane—to their rolling direction.

Figure 5:
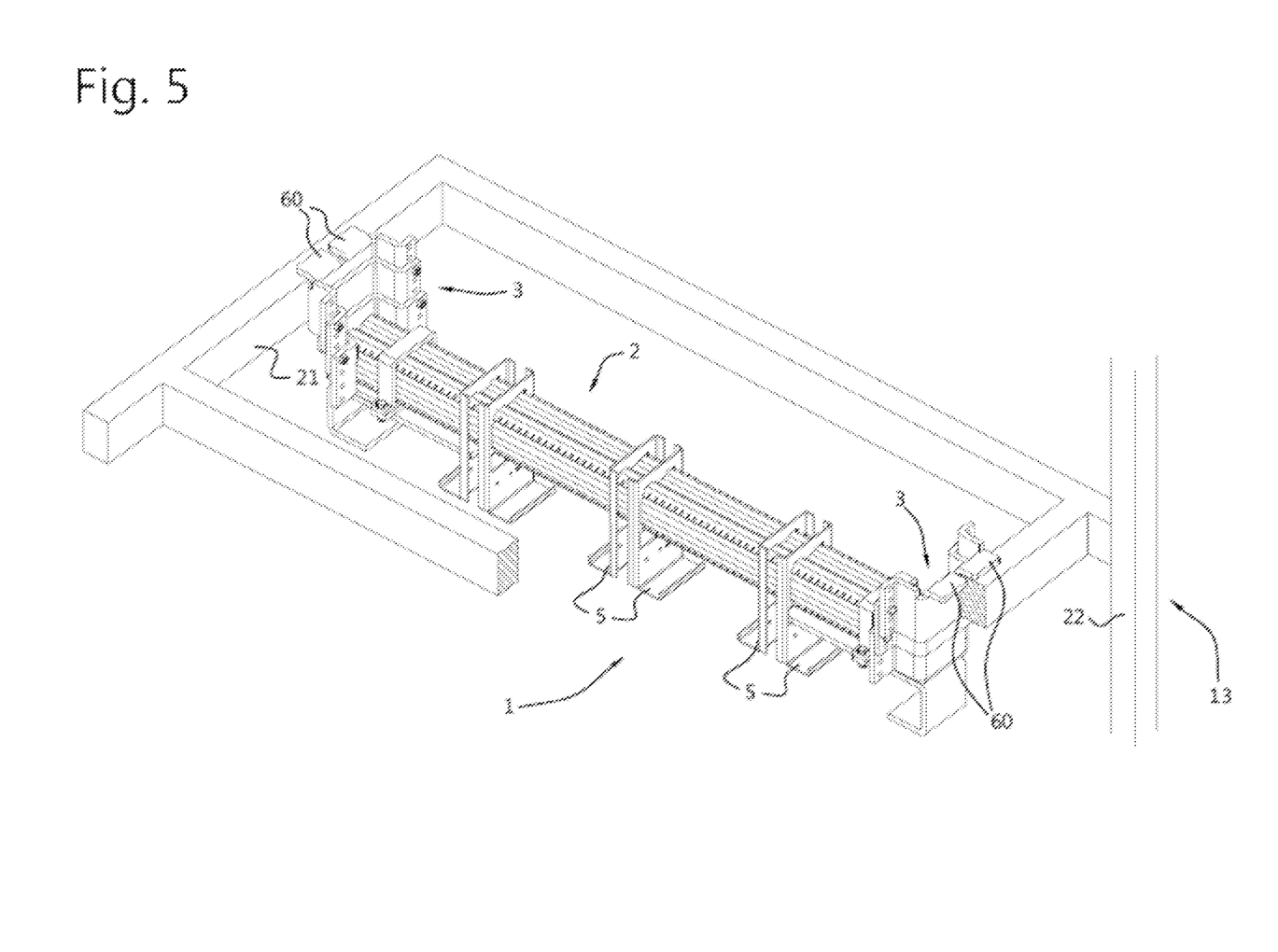
FIG. 5 shows a preferred embodiment with regard to the suspension of a cross-beam set (1) on a frame (13), according to the present invention.

FIG. 5 shows a preferred embodiment relating to the suspension of a cross-beam set (1) on a frame (13).

The frame (13) may comprise a pre-existing structure (13) located within a building, e.g. a warehouse, or it may be a structure specifically designed or placed to support a tracked shelving system. The typical frame (13) comprises a plurality of vertically oriented posts (22) extending upwardly from a floor surface. Said posts (22) form corners of joined rectangles seen from above. A pair of horizontal beams (21) extend between the tops of the posts (22) on a front and a rear of the frame (13), and optionally, a plurality of struts (not shown) extend between the posts (22) on the sides of the frames. Said struts may be at an angle between the posts (22) or they may be positioned horizontally. It is assumed that the posts (22), beams (21) and struts can have any cross-sectional shape, for example, L-shaped, U-shaped or rectangular. Although not shown, it is believed that the frame (13) may comprise walls and/or the ceiling of an area, for example a warehouse. The frame (13) supports a tracked shelving system above the floor surface. The frame (13) is partially cut away in this figure for clarity.

The cross-beam set (1) is the cross-beam set from FIG. 1. The beam hooks (3) of the cross-beam set (1) are hooked onto horizontal beams (21) of the frame (13) using the lips (60) and thus support the cross-beam (2) and attached components. The beam hooks are shown in an extended position, whereby the cross-beam (2) is positioned below the horizontal beams (21) of the frame (13). In a retracted position, the beam hooks (3) have a height that is at most equal to a height of the horizontal beams (21), increased by a thickness of the lip (60). It will be apparent to one skilled in the art that in the retracted position, an available storage space in the tracked shelving system within the frame (13) is maximized.

Figure 6:
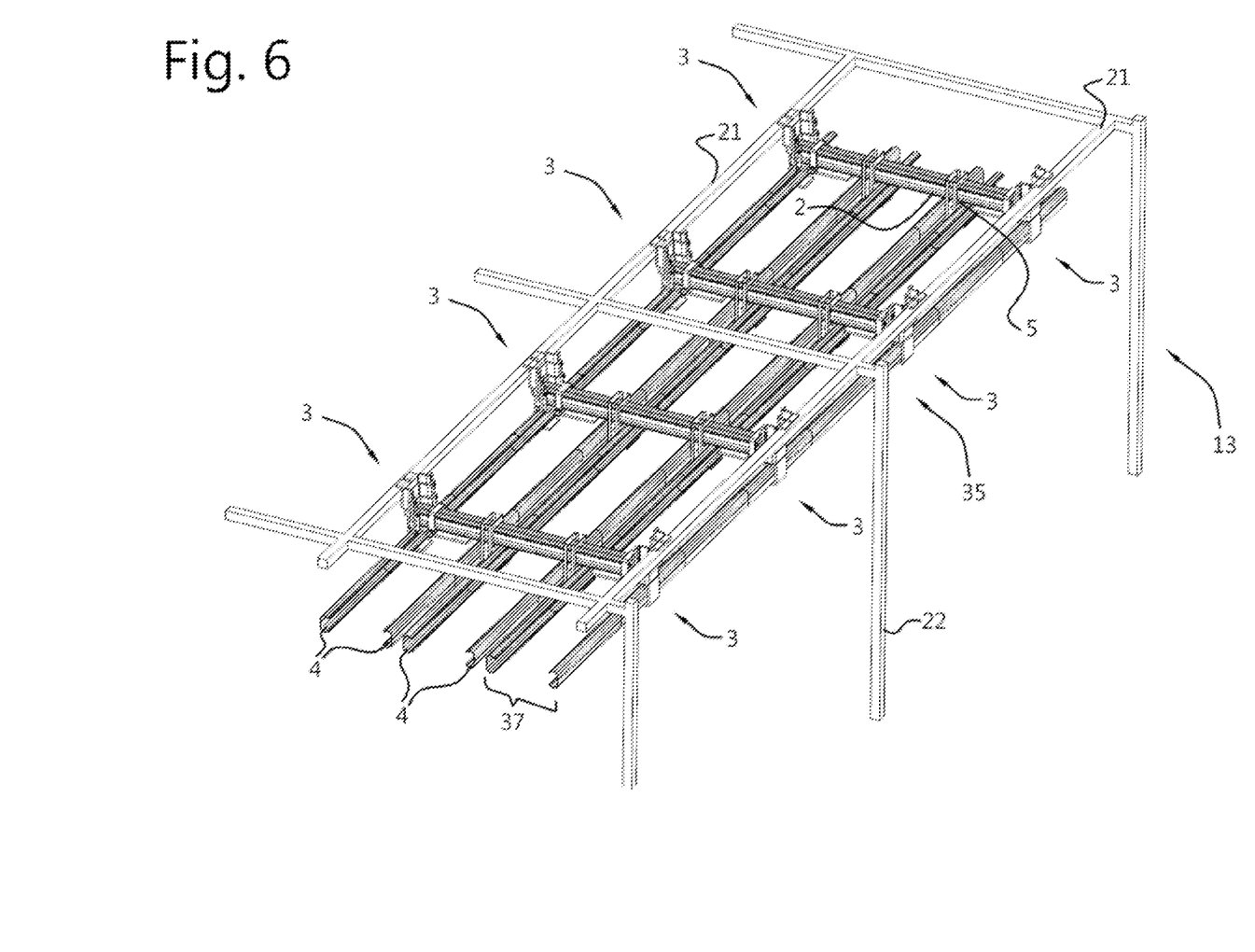
FIG. 6 shows a preferred embodiment of an assembled and suspended track module (35) on a frame (13), according to the present invention.

FIG. 6 shows a preferred embodiment of an assembled and suspended track module (35) on a frame (13).

The track module (35) comprises four cross-beam sets (1), similar to the cross-beam set from FIG. 1. Each cross-beam set (1) is hooked onto horizontal beams (21) of the frame (13) in a similar manner as in FIG. 5 using beam hooks (3). The track module (35) comprises four cross-beams (2). Each cross-beam (2) carries four connected track hooks (5) which in turn each support a part of a track beam (4). With the exception of two outer track beams (4), each track beam (4) is supported by four track hooks (5), each attached to different cross-beams (2). The two outer track beams (4) are supported by a short leg of four J-shaped brackets (71). The two outer track beams (4) are positioned below the telescopic U-shaped profiles (61, 62, 63) of beam hooks (3) thereby expanding available storage space in the tracked shelving system within a frame (13).

Figure 7:
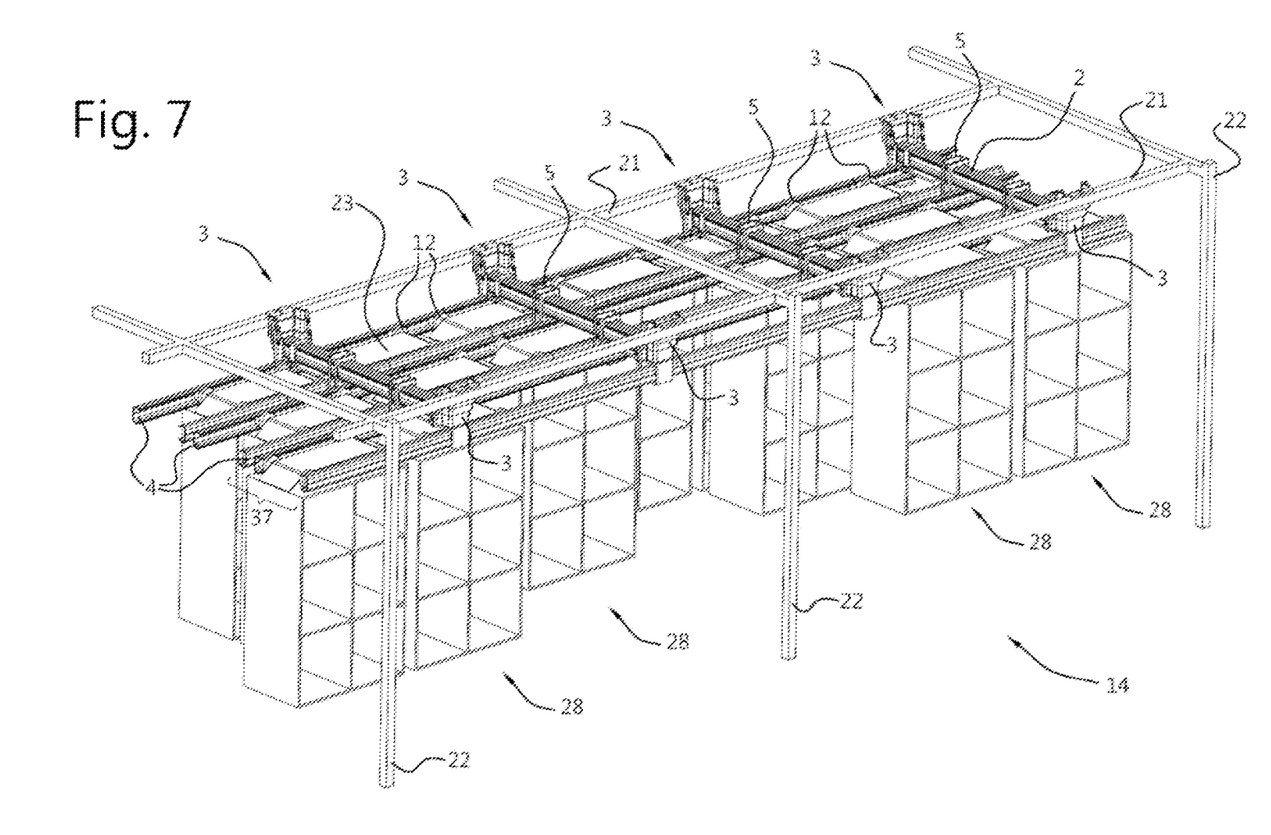
FIG. 7 shows a preferred embodiment of a tracked shelving system, comprising a track module (35) and a shelving module (14), according to the present invention.

FIG. 7 shows a preferred embodiment of a tracked shelving system, comprising a track module (35) and a shelving module (14).

The tracked shelving system comprises a track module (35), equal to the track module (35) of FIG. 6, and a plurality of shelving assemblies (28). The shelving assemblies (28) can be easily displaced and moved along the track beams (4).

Figure 8:
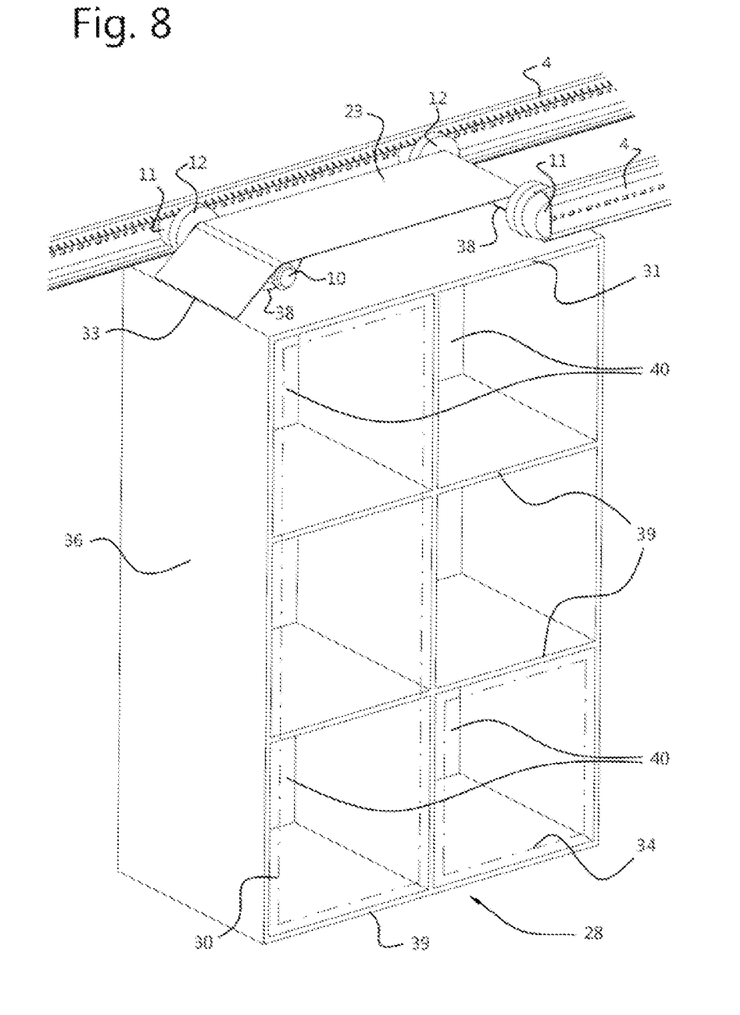
FIG. 8 shows a detailed and partial cross-sectional view of a preferred embodiment of the suspension of a shelving assembly (28) on track beams (4) of a track module (35), according to the present invention.

FIG. 8 shows a detailed and partial cross-sectional view of a preferred embodiment of the suspension of a shelving assembly (28) on track beams (4) of a track module (35).

FIG. 8 corresponds to the tracked shelving system of FIG. 7. A shelving assembly (28) comprises a plurality of compartments (34), at least one upper flexible connecting element (38) and two roller-bars (29). The roller-bars (29) correspond to the roller-bars from FIG. 4. The plurality of compartments (34) are defined by three side walls (36), three floor walls (39), one upper wall (31) and one backstop (40). At the upper wall (31), an upper component (23) attaches and suspends the shelving assembly (28) to two roller-bars (29). The upper component is formed by the flexible upper connecting element (38) positioned over the two roller-bars (29), the two ends of which are fixed to the upper wall (31) of the shelving assembly (28). The wheels (11) of said roller-bars (29) are configured to roll in the grooves of track beams (4) of the track module (35), whereby said shelving assemblies (28) can be easily displaced and moved.

Figure 9:
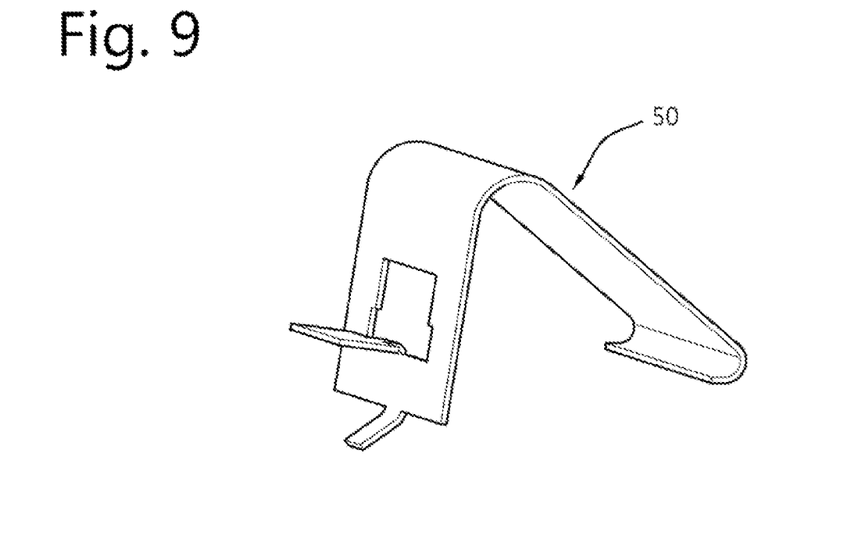
FIG. 9 shows a track securing clip (50), according to the present invention.

FIG. 9 shows a track securing clip (50). The track securing clip (50) can be removably connected to a track hook (5) by means of a track securing hole (51).

Figure 10:
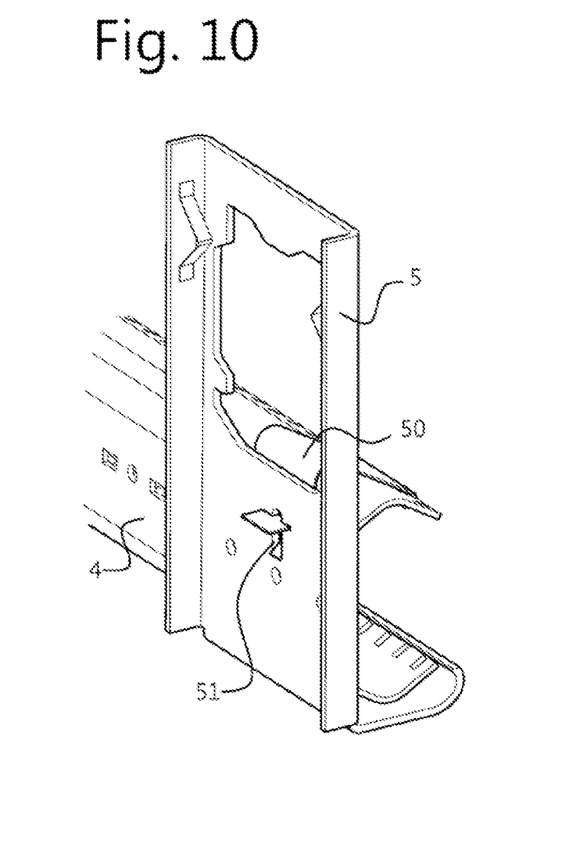
FIG. 10 and FIG. 11 show the detachable connection of a track securing clip (50) to a closed type track hook (5) by attachment to the track securing hole (51). A track beam (4) is held in place by means of this feature.
Figure 11:
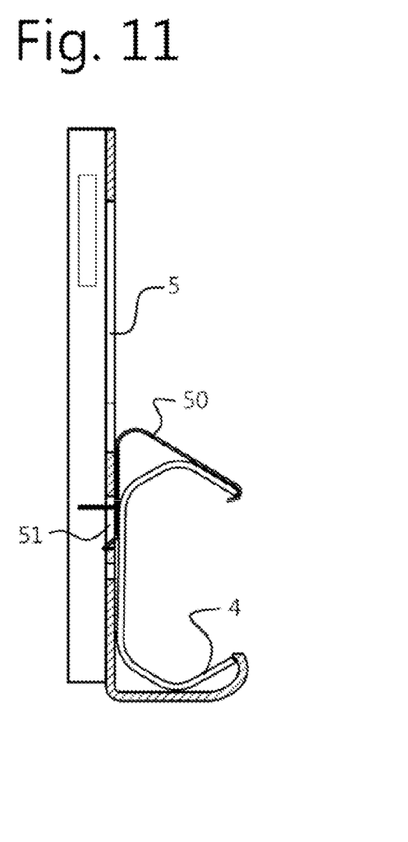

FIG. 10 and FIG. 11 show the detachable connection of a track securing clip (50) to a closed type track hook (5) by attachment to the track securing hole (51). The track clip (50) allows reversible clamping of a track beam (4), thereby securing the track beam (4) in place to prevent slipping, sliding and/or bending of the track beam (4). A track beam (4) is held in place by means of this feature.

Figure 12:
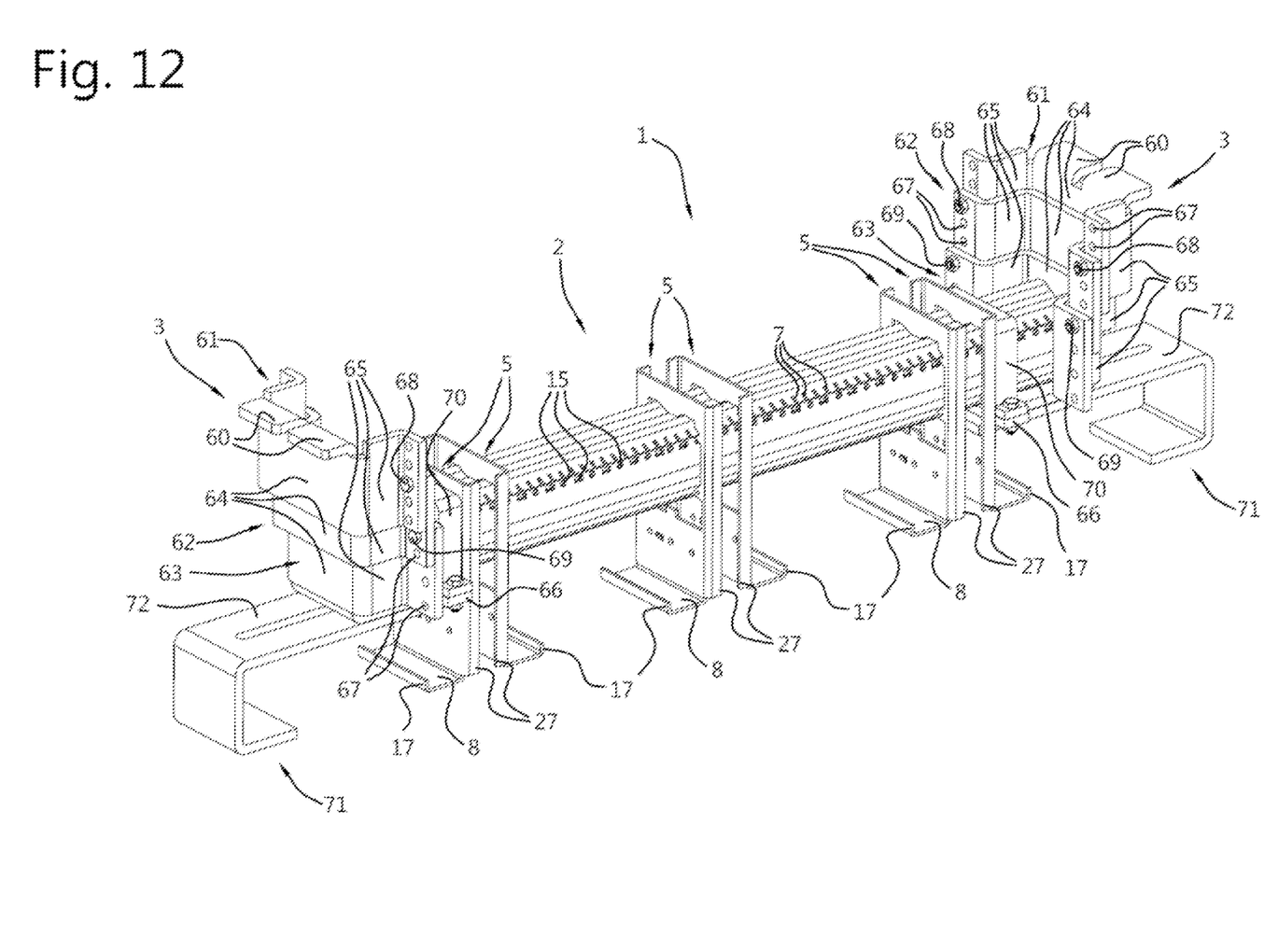
FIG. 12 shows a preferred embodiment with regard to the suspension of a cross-beam set (1) on a frame (13), according to the present invention, wherein J-shaped brackets (71) of beam hooks (3) are shifted outwards as much as possible.

FIG. 12 shows a preferred embodiment relating to the suspension of a cross-beam set (1) on a frame (13), wherein 3-shaped brackets (71) of beam hooks (3) are shifted outwards as much as possible.

The cross-beam kit (1) is very similar to in FIG. 1. The difference is that the J-shaped brackets (71) are shifted outwards. By sliding the J-shaped bracket (71) outside the frame (13) it is possible for a track beam (4) to be positioned outside the frame (13), thereby expanding storage space in the tracked shelving system outside the frame (13).

Figure 13A:
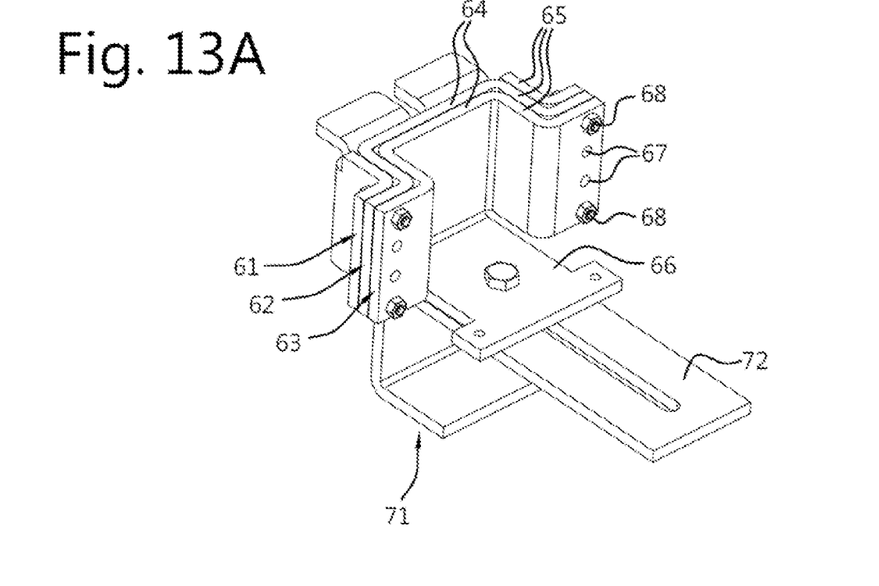
FIG. 13A and FIG. 13B show a beam hook (3) according to a preferred embodiment of the present invention, in a fully retracted position and a fully extended position, respectively.
Figure 13B:
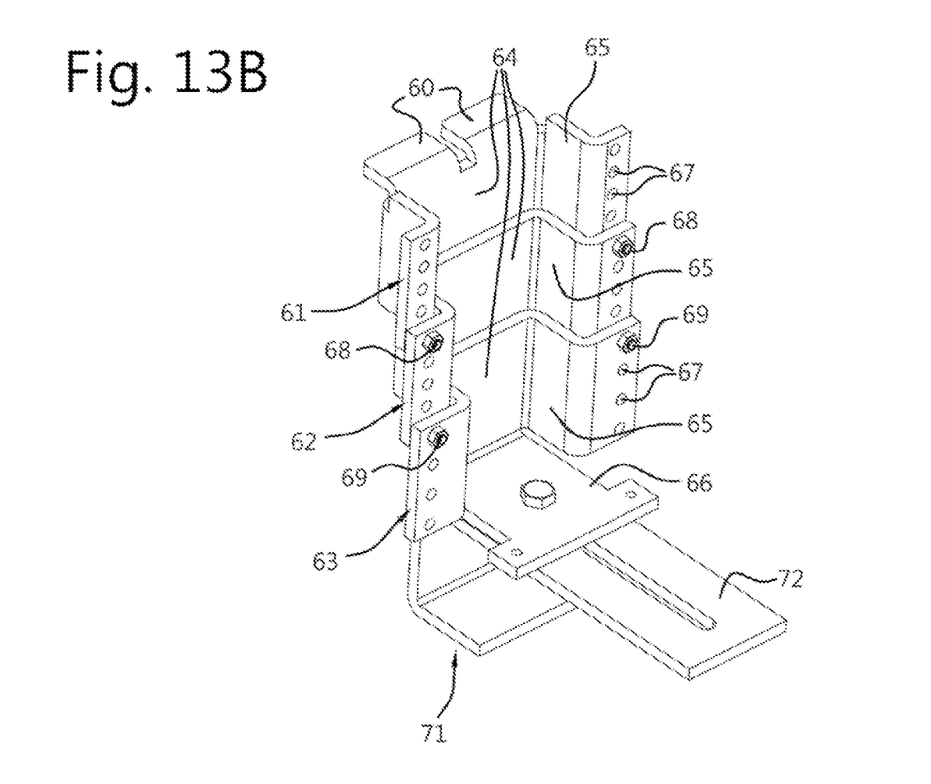

FIG. 13A and FIG. 13B show a beam hook (3) according to a preferred embodiment of the present invention, in a fully retracted position and a fully extended position, respectively.

The beam hook (3) is similar to in the previous figures. The U-shaped bracket (70) is not shown in FIGS. 13A and 13B for clarity. The beam hook (3), in the fully retracted position in FIG. 13A, has a height that is at most equal to a height of the horizontal beams (21) of the frame (13), plus a thickness of the lip (60) for hooking on the horizontal bars (21). In FIG. 13B it can be clearly seen that there is an equal first intermediate distance between adjacent locking holes (67) of the outer profile (61) and the intermediate profile (62) and that there is an equal second intermediate distance between adjacent locking holes (67) of the inner profile (63). The first intermediate distance and the second intermediate distance are different.

The invention claimed is:

1. A tracked shelving system comprising a frame having a plurality of vertical posts and a plurality of horizontal beams supported by the vertical posts, and further comprising a track module and a shelving module connected to said frame, wherein said track and shelving modules comprise:
    a plurality of beam hooks coupled to said horizontal beams;
    a plurality of cross-beams coupled to at least two beam hooks;
    a plurality of track hooks coupled to said cross-beams, the cross-beams being provided with a plurality of notches positioned regularly along the length of said cross-beam to clamp said track hooks to the cross-beams;
    a plurality of track beams supported by said track hooks; and
    a shelving assembly that is displaceable between two of the plurality of track beams;
    wherein the beam hooks comprise at least two telescopic U-shaped profiles comprising at least an outer profile and an inner profile, wherein the outer profile comprises a lip for hooking onto said horizontal beams, and the inner profile comprises a horizontal support surface for supporting at least one of the cross-beams.

2. The tracked shelving system according to claim 1, wherein the telescopic U-shaped profiles comprise locking holes, wherein there is an equal first intermediate distance between adjacent locking holes of the outer profile and wherein there is an equal second intermediate distance between adjacent locking holes of the inner profile, wherein the first intermediate distance and the second intermediate distance are different.

3. The tracked shelving system according to claim 1, wherein the beam hooks are retractable, and where the beam hooks in a retracted position have a height which is at most equal to a height of said horizontal beams, plus a thickness of the lip for hooking onto said horizontal beams.

4. The tracked shelving system according to claim 1, wherein the beam hooks comprise a U-shaped bracket for clamping one of the plurality of cross-beams between the U-shaped bracket and the horizontal support surface.

5. The tracked shelving system according to claim 1, wherein each of the beam hooks comprises a J-shaped bracket comprising a longer leg and a plurality of shorter legs, for supporting at least one of the track beams, wherein the J-shaped bracket is slidably attached to an underside of the horizontal support surface with the longer leg of the J-shaped bracket.

6. The tracked shelving system according to claim 1, wherein the coupling of at least one track hook is removable.

7. The tracked shelving system according to claim 1, wherein the coupling of at least one track hook with at least one cross-beam comprises a click-and-clamp mechanism.

8. The tracked shelving system according to claim 1, wherein said track hooks comprise an edge surrounding an opening for receiving one of the plurality of cross-beams, wherein said edge is snapped into at least one notch of the cross-beam.

9. The tracked shelving system according to claim 8, wherein said edge of the track hooks comprises one or more teeth snapped into the notches of the cross-beam.

10. The tracked shelving system according to claim 8, wherein said edge of one or more track hooks incompletely surrounds the opening for receiving one of the plurality of cross-beams.

11. The tracked shelving system according to claim 1, wherein the telescopic U-shaped profiles of the beam hooks have a profile thickness between 2 mm and 6 mm.

12. The tracked shelving system according to claim 1, wherein at least one of the cross-beams comprises two back-to-back track beams.

13. The tracked shelving system according to claim 1, wherein at least one of the track beams is removably attached to the track hooks by means of one or more securing clips.

14. The tracked shelving system according to claim 1, wherein the track beams are coupled two by two, forming coupled track beams, and wherein the coupled track beams are oriented in reverse directions.

15. A kit for completing a tracked shelving system in a frame according to claim 1, the kit comprising:
- a plurality of beam hooks;
- a plurality of cross-beams;
- a plurality of track hooks;
- a plurality of track beams; and
- components of the shelving module;
- wherein beam hooks comprise at least two telescopic U-shaped profiles comprising at least an outer profile and an inner profile, wherein the outer profile comprises a lip for hooking onto the frame, and the inner profile comprises a horizontal support surface for supporting one of the plurality of cross-beams.

* * * * *